ища
US012398533B2

(12) United States Patent
Steinlage et al.

(10) Patent No.: US 12,398,533 B2
(45) Date of Patent: Aug. 26, 2025

(54) CONTINUOUS CALIBRATION OF GRADE CONTROL SYSTEM

(71) Applicant: Caterpillar SARL, Geneva (CH)

(72) Inventors: Justin L. Steinlage, Mackinaw, IL (US); Christopher Wright, Peoria, IL (US)

(73) Assignee: Caterpillar SARL, Geneva (CH)

( * ) Notice: Subject to any disclaimer, the term of this patent is extended or adjusted under 35 U.S.C. 154(b) by 798 days.

(21) Appl. No.: 17/725,931

(22) Filed: Apr. 21, 2022

(65) Prior Publication Data
US 2023/0340755 A1 Oct. 26, 2023

(51) Int. Cl.
E02F 9/26 (2006.01)
E02F 3/16 (2006.01)
E02F 3/43 (2006.01)
E02F 3/84 (2006.01)
E02F 3/90 (2006.01)
G06T 7/00 (2017.01)

(52) U.S. Cl.
CPC .............. *E02F 3/907* (2013.01); *E02F 3/16* (2013.01); *E02F 3/842* (2013.01); *E02F 3/847* (2013.01)

(58) Field of Classification Search
CPC ... E02F 3/907; E02F 3/16; E02F 3/842; E02F 3/847; E02F 3/844; E02F 3/7618; E02F 3/7613; E02F 3/32; E02F 9/265; E02F 9/268; G06T 7/0006; G06Q 10/20
See application file for complete search history.

(56) References Cited

U.S. PATENT DOCUMENTS

| 9,613,413 | B2 | 4/2017 | Hasselbusch et al. |
| 9,624,643 | B2 | 4/2017 | Hendron et al. |
| 9,957,692 | B2 | 5/2018 | Morin |
| 2010/0121540 | A1* | 5/2010 | Kumagai ................ G01S 5/163 |
|  |  |  | 701/50 |
| 2017/0352199 | A1 | 12/2017 | Finley et al. |
| 2018/0038082 | A1* | 2/2018 | Hashimoto ........... E02F 3/7609 |

(Continued)

FOREIGN PATENT DOCUMENTS

WO 2019182582 A1 9/2019

OTHER PUBLICATIONS

Written Opinion and International Search Report for Int'l. Patent Appln. No. PCT/EP2023/025180, mailed Jul. 18, 2023 (13 pgs).

*Primary Examiner* — Christopher J Sebesta
*Assistant Examiner* — Robert E Pezzuto

(57) ABSTRACT

A work machine includes a frame, a linkage assembly, a work implement connected to the linkage assembly, and a grade control calibration system. The grade control calibration system includes a vision processing system, which includes a sensor fixed to the linkage assembly and a first controller. The vision processing system is configured to measure a length of a cutting portion of the work implement, and to transmit the length of the cutting portion of the work implement. The grade control calibration system also includes a grade control system in communication with the vision processing system and the linkage assembly. The grade control system includes a second controller configured to receive the length of the cutting portion of the work implement from the first controller, and to calibrate a position of the work implement based on the received length of the cutting portion of the work implement.

20 Claims, 5 Drawing Sheets

(56) References Cited

U.S. PATENT DOCUMENTS

2020/0232192 A1     7/2020   Sherlock
2020/0362539 A1    11/2020   Plouzek et al.
2020/0362542 A1*   11/2020   Veasy .................... E02F 3/765

* cited by examiner

CONTINUOUS CALIBRATION OF GRADE CONTROL SYSTEM

TECHNICAL FIELD

The present disclosure relates generally to a grade control system, and more particularly, to a method and system for continuous calibration of the grade control system of a work machine based.

BACKGROUND

Conventional earthmoving machines such as track-type tractors, motor graders, scrapers, and/or backhoe loaders, may include a ground-engaging implement, such as a dozer blade or bucket, which may be used on a worksite in order to alter a geography or terrain of a section of earth. The implement may be controlled by an operator and/or by an autonomous grade control system. To achieve a final surface contour or a final grade, the implement may be adjusted to various positions by the operator or the grade control system. Accurately positioning the implement, however, requires knowledge by the grade control system and/or operator of the machine as to the specific dimensions of the implement and its components.

For example, the ground-engaging implements described above may include earth cutting portions such as teeth, shrouds, and/or lips. These earth cutting portions may wear more quickly than underlying equipment, as they initiate contact with the ground surface before the body of the excavating bucket and may encounter highly abrasive materials. These conditions cause the earth cutting portions to erode and, eventually, to wear out or fail. If not regularly updated, the grade control system will inaccurately position the implement during grading, resulting in an incorrect surface contour or grade. Manual calibration events are typically performed at certain intervals, for example, monthly, to measure various components of the implement, including the earth cutting portions, and to update the dimensions in the grade control system. However, manual calibration is tedious, time consuming, and costly for operators and maintenance personnel.

Prior art attempts to determine wear associated with a part rely on determining when a part needs replacement. For example, U.S. Pat. No. 9,613,413 describes systems and methods for determining part wear using a mobile device. The system relies on capturing digital images using a camera on the mobile device and determining wear using a differential number of pixels between the imaged part and a simulated surface of an unworn part. A percentage or degree of wear is determined based on these distances. According to the degree of wear, an alert or warning is displayed to a user indicating replacement for the part is necessary.

In light of the foregoing, a need exists for continuous calibration of grade control systems.

SUMMARY

In accordance with one aspect of the present disclosure, a work machine is disclosed. The work machine may include a frame, a linkage assembly, a work implement connected to the linkage assembly, and a grade control calibration system. The grade control calibration system may include a vision processing system, which may include a sensor fixed to the linkage assembly and a first controller. The vision processing system may be configured to measure a length of a cutting portion of the work implement, and to transmit the length of the cutting portion of the work implement. The grade control calibration system may also include a grade control system in communication with the vision processing system and the linkage assembly. The grade control system may include a second controller configured to receive the length of the cutting portion of the work implement from the first controller, and to calibrate a position of the work implement based on the received length of the cutting portion of the work implement.

In accordance with another aspect of the present disclosure, a grade control calibration system for a work machine is disclosed. The work machine may include a frame, a linkage assembly and a work implement. The grade control calibration system may include a vision processing system and a grade control system. The vision processing system may include an imaging device fixed to the linkage assembly and configured to generate a three-dimensional point cloud of a cutting portion of the work implement, and a vision controller in electronic communication with the imaging device and configured to calculate a current length of the cutting portion of the work implement based on the three-dimensional point cloud generated by the imaging device. The vision controller may transmit the current length of the cutting portion of the work implement. The grade control system may be in communication with the vision processing system and the linkage assembly and may include a grading controller configured to receive the current length of the cutting portion of the work implement from the vision controller and to calibrate a position of the work implement relative to the terrain based on the received length of the cutting portion of the work implement.

In accordance with yet another aspect of the present disclosure, a method of grading terrain using a work implement of a work machine. The work machine may include a linkage assembly and a sensor coupled to the linkage assembly. The method may include detecting the work implement within a field of view of the sensor; identifying, by the sensor, a cutting portion of the work implement; calculating, by a controller electronically coupled to the sensor, a length of the cutting portion of the work implement; calibrating, by the controller, a grade control system of the work machine based on the calculated length of the cutting portion of the work implement; maneuvering, by the calibrated grade control system, the cutting portion of the work implement proximate the terrain; and grading the terrain with the cutting portion of the work implement.

These and other aspect and features of the present disclosure will be better understood upon reading the following detailed description when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
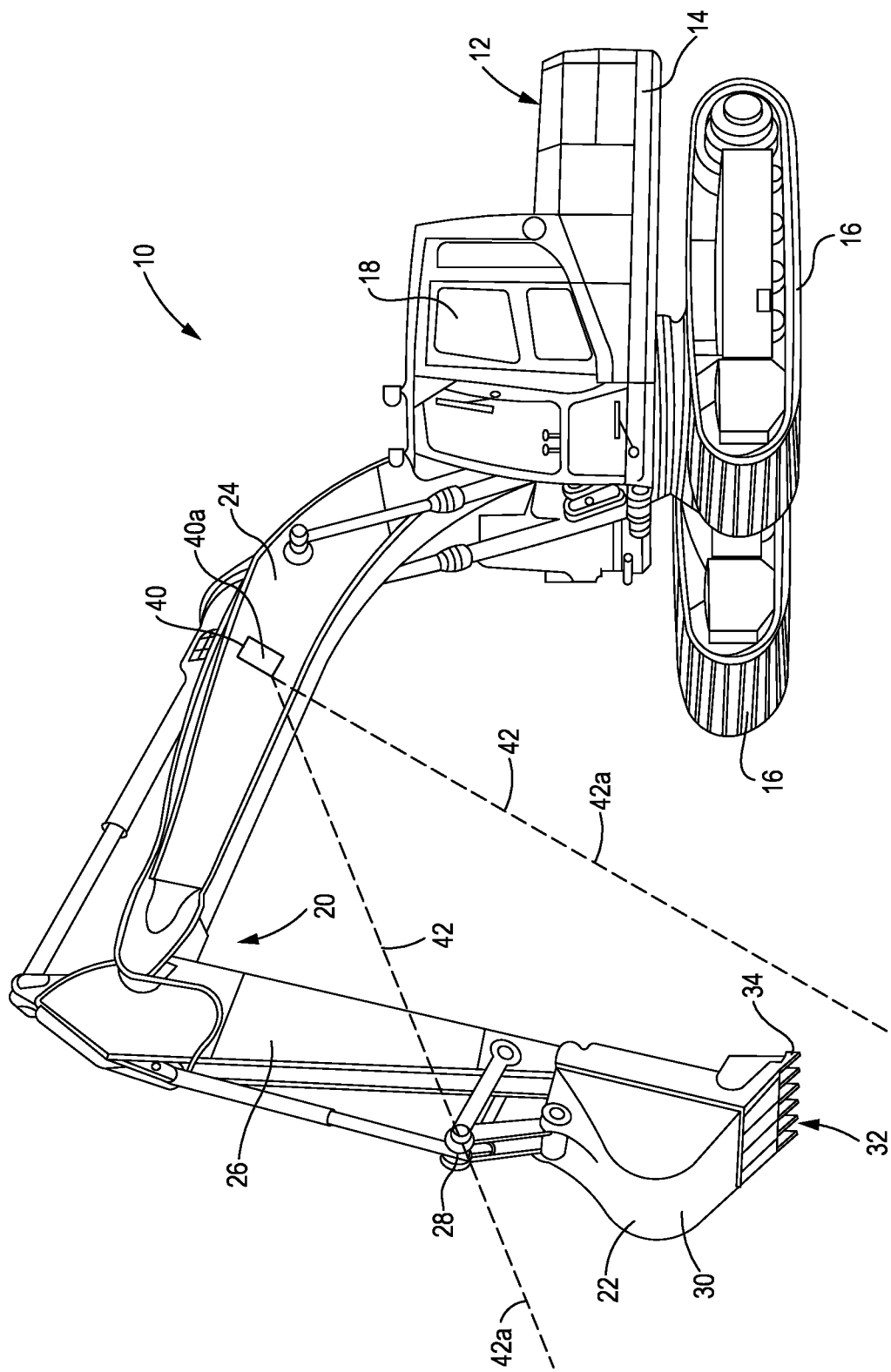
FIG. 1 is a side view of an exemplary work machine, according to an embodiment of the present disclosure.

An exemplary embodiment of a work machine 10 is illustrated in FIG. 1. The work machine 10 may be, for example, an excavator, a wheeled or tracked loader, a mining shovel, a backhoe loader, or any other type of work machine known in the art. As an excavator, the work machine 10 may include a power source 12 (e.g., an engine, a motor, a battery bank, etc.) mounted to a frame 14 and configured to drive one or more ground-engaging elements 16 for propelling the work machine 10 across a worksite. The ground-engaging elements 16 may be mounted or movably coupled to the frame 14 and may include, for example, tracks, wheels, and/or combinations thereof. The frame 14 may also support an operator cab 18 configured to house, for example, an operator's seat and an operator console or other machine control devices for controlling various functions of the work machine 10. In other embodiments, however, the work machine 10 may be an autonomous machine, a semi-autonomous machine, a remotely operated machine, or a remotely supervised machine, among others.

The illustrated work machine 10 may also include a linkage system 20 and a work implement 22 connected to the linkage system 20. The linkage system 20 may include a boom 24 pivotally connected to the frame 14, a stick 26 pivotally connected to the boom 24, and a linkage 28 pivotally connecting the work implement 22 and the stick 26. The work implement 22 may include a bucket 30 pivotally connected to the linkage 28. The bucket 30 may include a cutting portion 32 which, as illustrated, comprises a plurality of teeth 34. In other embodiments, the cutting portion 32 may comprise a smooth edge.

The work machine 10 may further include a sensor 40 configured to, among other things, measure a length of each of the plurality of teeth 34. By way of example only, and not by way of limitation, the sensor 40 may be an imaging device such as a smart camera or smart vision system, a monocular camera, an infrared camera, a high resolution camera, an array of one or more types of cameras, an opto-acoustic sensor, a radar, a laser based imaging sensor, or the like, or combinations thereof, configured to assist recognition, and monitoring of the work implement 22 and the worksite. The sensor 40 may be positioned on the work machine 10 to obtain a field of view 42 toward the work implement 22. More specifically, the sensor 40 may be an imaging device positioned on the work machine 10 to capture images in their field of view 42 during operation of the work machine, and having a dedicated processor onboard, including video processing acceleration provided by a field-programmable gate array (FPGA), a digital signal processor (DSP), a general purpose graphics processing unit (GP-GPU), or any other suitable microprocessor with supporting application software, capable of determining depth and volume from real-time images or videos.

As illustrated, the work machine 10 may include a left imaging device 40a mounted on a left side 44 of the boom 24, and a right imaging device 40b (not shown) mounted on the right side (not shown) of the boom. In other embodiments, the work machine 10 may also include one or more imaging devices 40 mounted on a left side of the stick 26 and/or a right side of the stick. The imaging devices 40a, 40b may be stereo cameras. The left imaging device 40a may continuously capture images and/or videos in its field of view 42a, which may include worksite terrain primarily to the left side and in front of (in a direction of travel) the work machine 10 and at least a left half 46 (see also FIG. 4) of the work implement 22. The right imaging device 40b may continuously capture images and/or videos in its field of view 42b, which may include worksite terrain primarily to the right side and in front of the work machine 10 and at least a right half 48 (see also FIG. 4) the work implement 22.

Figure 2:
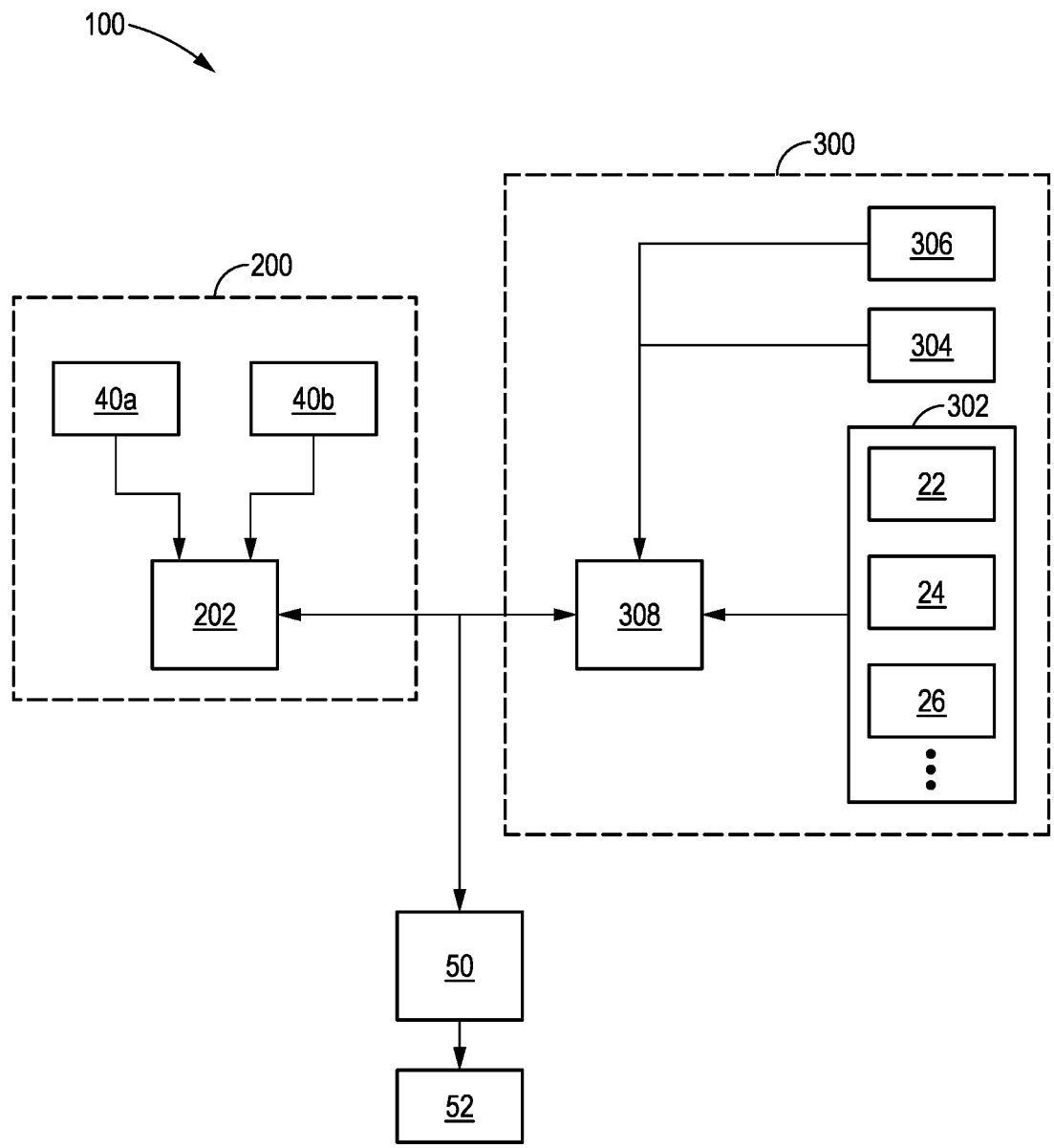
FIG. 2 is a schematic diagram of a grade control calibration system, according to an embodiment of the present disclosure.

Referring now to FIG. 2, the work machine 10 may further include a grade control calibration system 100 including a vision processing system 200 and a grade control system 300. The vision processing system 200 may include the left imaging device 40a, the right imaging device 40b and a vision controller 202. The grade control system 300 may include a plurality of position sensors 302, an inertial measurement unit (IMU) 304, a global positioning system (GPS) unit 306 and a grade controller 308. In one embodiment, the plurality of position sensors 302 are electrohydraulic position sensors associated with hydraulic components (e.g. cylinder or cylinder rods) of the boom 24, the stick 26 and the work implement 22, and configured to detect positional and/or velocity information associated with these components. Such linkage kinematics may be used to assist with calibrating a position of the work implement 22, as will be discussed in further detail below.

The grade controller 308 may be in electronic communication with the vision controller 202, and both may communicate with a gateway controller 50. The gateway controller 50 may, for example, provide a connection between the vision controller 202 and the grade controller 308 and at least one remote entity 52 via a network (not shown). In such an arrangement, the gateway controller 50 may transmit data to and receive data from the remote entity 52 via the network. The remote entity 52 may include a web server, computing device and/or storage device (e.g. database). In one embodiment, the remote entity 52 may be a database for storing a variety of information related to the grade control system 300 and the vision processing system 200. More specifically, the database may store a list of machines, including the work machine 10, each identified by a unique identifier. The table may associate each unique identifier with a set of data related to the components of each machine. For example, as to the work machine 10, the table may associate a set of characteristics associated with the work implement 22, such as a bucket 30 identifier or model number, an original number of teeth 34, an original number of lip shrouds 64 (FIG. 4), an original length of each tooth, a 3D tooth profile, and a 3D shroud profile. This data may be accessed and updated by both the vision processing system 200 and the grade control system 300 through the gateway controller 50.

Each of the vision controller 202, the grade controller 308 and the gateway controller 50 may include any type of device or any type of component that may interpret and/or execute information and/or instructions stored within a memory (not shown) to perform one or more functions. The memory may include a random access memory ("RAM"), a read only memory ("ROM"), and/or another type of dynamic or static storage device (e.g., a flash, magnetic, or optical memory) that stores information and/or instructions for use by the example components, including the information and/or instructions used by the vision controller 202, the grade controller 308 and the gateway controller 50 (as explained in further detail below). Additionally, or alternatively, the memory may include non-transitory computer-readable medium or memory, such as a disc drive, flash drive, optical memory, read-only memory (ROM), or the like. The memory may store the information and/or the instructions in one or more data structures, such as one or more databases, tables, lists, trees, etc. Finally, each of the vision controller 202, the grade controller 308 and the gateway controller 50 may include a processor (e.g., a central processing unit, a graphics processing unit, an accelerated processing unit), a microprocessor, and/or any processing logic (e.g., an FPGA, an application-specific integrated circuit (ASIC), etc.), and/or any other hardware and/or software.

Figure 3:
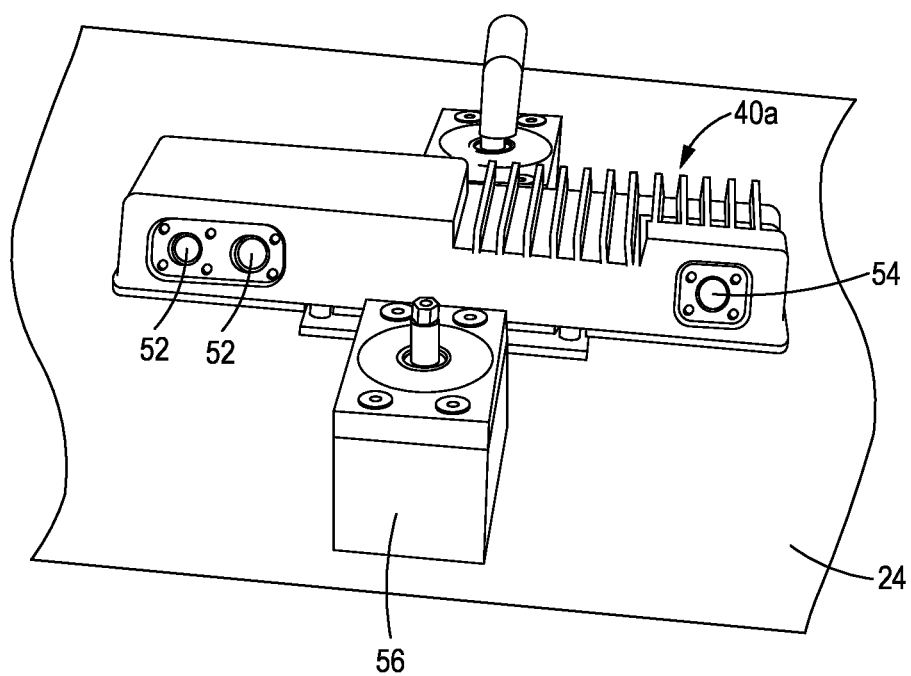
FIG. 3 is a perspective view of a camera system of the exemplary work machine of FIG. 1, according to an embodiment of the present disclosure.

Referring now to FIG. 3, the left imaging device 40a is illustrated. While only the left imaging device 40a is illustrated in FIG. 3, the description and discussion herein of the left imaging device should be understood to refer analogously to the right imaging device 40b, except where otherwise indicated or apparent. As illustrated, the left imaging device 40a may be a stereo camera module including a pair of monochrome lenses 53 and a color camera lens 54. The monochrome camera lens 53 may capture, for each pixel of an image, an amount of light. In other words, the monochrome camera lens 53 may capture the image in black-and-white. Similarly, the color camera lens 54 may capture, for each pixel of an image, a color hue. In other words, the color camera lens 54 may capture the image in color. The left imaging device 40a may also be capable of capturing images of its field of view in all levels of ambient light (i.e. both during the day and at night) with or without color.

The left imaging device 40a may be fixed to a mount 56, which may be installed on a portion of the boom 24 of the work machine 10. The mount 56 may be magnetic, and may thus be repositionable on the boom 24, the stick 26, the frame 14 or another area of the work machine 10 in order to adjust the field of view 42a of the left imaging device 40a. In other embodiments, the mount 56 may be a mount typically known in the art which integrates the left imaging device 40a on the work machine 10.

The left imaging device 40a utilizes a three-dimensional (3D) point cloud system, in which points within an image captured by the left imaging device (hereinafter referred to as a "stereo image") are stitched together to generate a 3D cloud map from which the depth and/or distance of objects with respect to the environment and to each other may be determined. In operation, therefore, the left imaging device 40a may capture a stereo image and generate a 3D cloud map of the worksite, the work implement 22, and any other objects within the left imaging device's field of view 42a. The vision controller 202 may use the stereo image to generate a disparity map, may overlay the 3D cloud map onto the disparity map, and consequently, measure relevant distances, depths, etc. More specifically, the vision processing system 200 may calculate a length of a tooth 34 of the work implement 22 by generating a 3D cloud map of the work implement 30, identifying the specific region of the 3D cloud map that corresponds to the tooth 34 of the work implement, generating a disparity map, and overlaying the tooth region of the 3D cloud map on the disparity map to obtain a length value of the tooth.

Figure 4:
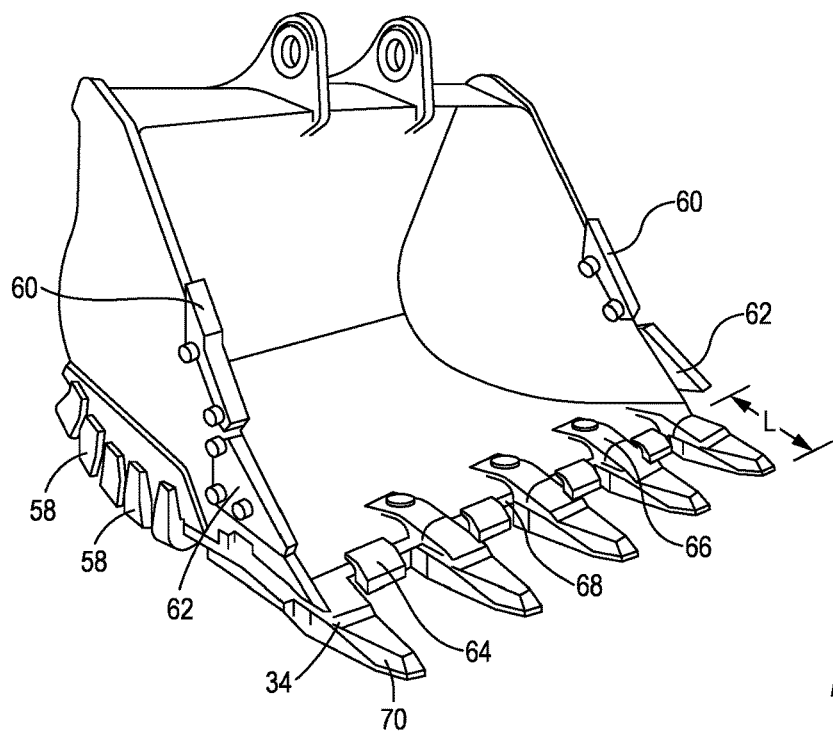
FIG. 4 is a front view of a work implement of the exemplary work machine of FIG. 1, according to an embodiment of the present disclosure.
Figure 5:
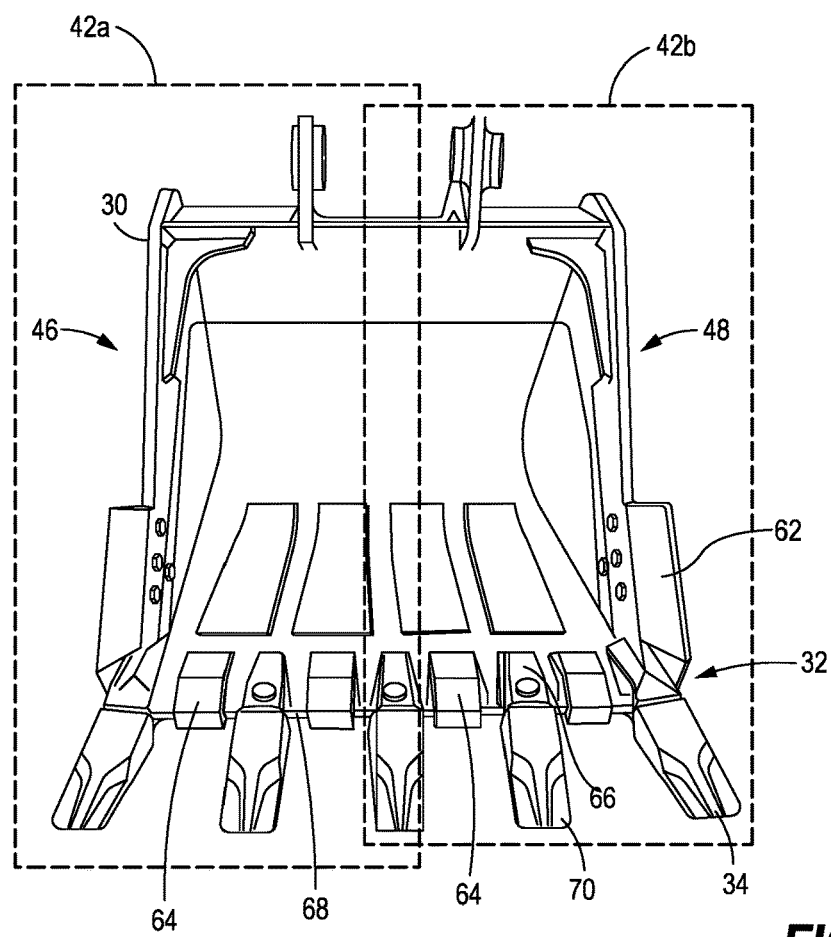
FIG. 5 is a perspective view of a work implement of the exemplary work machine of FIG. 1, according to an embodiment of the present disclosure.

As shown in FIGS. 4 and 5, and as noted above, the work implement 22 may comprise a bucket 30 with a cutting portion 32. The bucket 30 may also generally include a plurality of heel shrouds 58, a pair of side protectors 60, and a pair of side cutters 62. The cutting portion 32 may include a plurality of ground engaging tool assemblies or teeth 34 and a plurality of lip shrouds 64. Each tooth 34 may include an adapter 66 configured to engage a base edge 68 of the cutting portion 32 of the bucket 30. Each tooth 34 may also include a ground engaging tip 70 removably attached to the adapter 66. The tip 70 may endure the majority of the impact and abrasion caused by engagement with work material, and may consequently wear down more quickly than, for example, the adapter 66. As the grade control system 300 relies on knowing a length L of each tooth 34 to determine a position of the work implement 22 relative to the terrain of the work site, it is imperative that the grade control system utilizes an accurate length of each tooth in its calibration. Traditionally, machine operators, owners, servicemen, or dealers periodically observe the amount of erosion sustained or "wear level" of each tooth 34, measure each tooth, and manually update the measurements associated with the grade control system 300. However, this procedure can be costly, time consuming and inaccurate.

INDUSTRIAL APPLICABILITY

The teachings of the present disclosure may find applicability in many industries including, but not limited to, earth moving equipment. In addition, the disclosed systems and methods may find application in any environment in which determining a length of a part is desired. The present solution reduces the time, energy and costs required to continually and manually measure a tooth of a work implement and calibrate a grade control system, and enables an accurate position of the work implement while grading. One skilled in the art will recognize, however, that the disclosed grade control calibration system could be utilized in relation to other machine components subject to wearing and erosion that may or may not be associated with a work implement or ground engaging tool.

Figure 6:
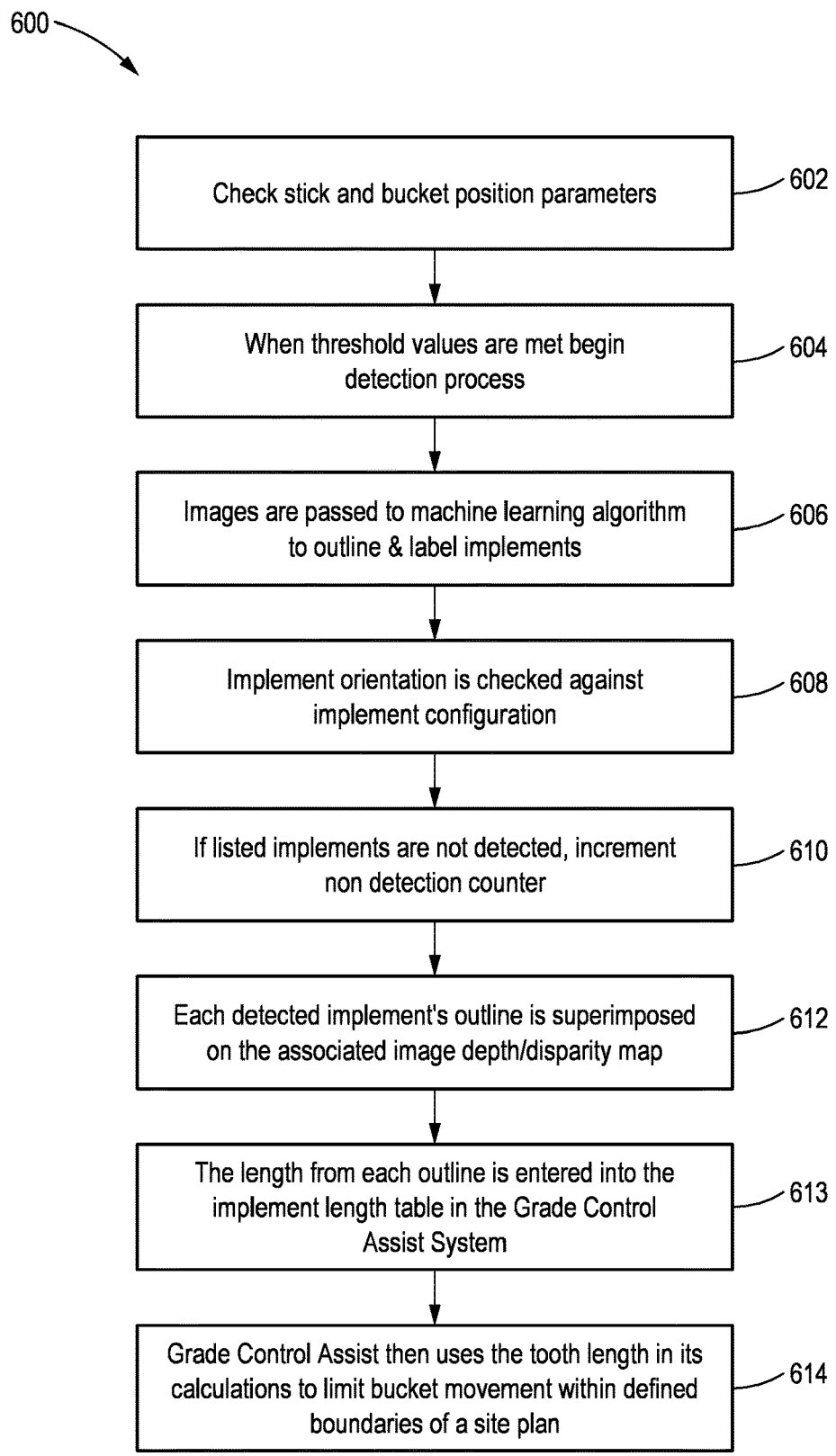
FIG. 6 is a flowchart illustrating a method of grading, according to an embodiment of the present disclosure.

Referring now to FIG. 6, and with continued reference to FIGS. 1-5, a method 600 of grading using the present grade control calibration system is provided in flowchart format. Prior to operation of the work machine 10 at a worksite, a pre-existing three dimensional site map as well as a work tool profile may be retrieved by the work machine from the remote entity 52. More specifically, an operator of the work machine 10 may use the operator console in the operator cab to select the specific model number of the bucket 30. The profile associated with the bucket 30 may then be retrieved and loaded into the grade control system 300. As noted above, the profile of the bucket 30 may include a bucket identifier or model number, an original number of teeth 34 installed on the bucket, an original number of lip shrouds 64 installed on the bucket, an original length of each tooth, a 3D tooth profile, and a 3D shroud profile.

As the work machine 10 operates, the sensors 40 may continuously scan the work implement 22 and the environment around the work machine 10 as it moves about the worksite. To begin the calibration of the grade control system, and to properly measure the length L of the teeth 34 of the work implement 22, the entire bucket 30 needs to be within the fields of view 42a, 42b of the left imaging device 40a and the right imaging device 40b. As illustrated in FIG. 5, for example, the bucket 30 is within the fields of view 42a, 42b of the imaging devices 40, with an area of overlap 72. To achieve this alignment, the grade control system 300 and the vision processing system 200 monitor the linkage kinematics of the work machine 10. Namely, data transmitted to the grade controller 308 from the plurality of position sensors 302, as well as data provided by the IMU 304, and global positioning data provided by the GPS unit 306 is monitored until the values of each linkage kinematic data enters a predetermined threshold (step 602).

Once the threshold values are met, the bucket 30 is considered aligned within the fields of view 42a, 42b of the left and right imaging devices 40a, 40b, and the imaging devices 40 may begin their detection process (step 604). For example, the left imaging device 40a would capture a stereo image of the bucket 30, as illustrated in FIG. 5, for example, and transmit the image to the vision processing controller 202 (step 606). Simultaneously, the right imaging device 40b would capture a stereo image of the bucket 30, as illustrated in FIG. 5, for example, and transmit the image to the vision processing controller 202 (step 606). The vision controller 202 may use the stereo images to generate a depth or disparity map.

Once received by the vision processing controller 202, the images are analyzed and the plurality of teeth 34, the plurality of lip shrouds 64 and other implements (e.g. side cutters 62) may be identified using machine learning algorithms, as generally understood in the art. The machine learning algorithms may be trained to detect positions of teeth 34, lip shrouds 64, and other implements and to generate a 3D point cloud outline of the teeth, shroud and other detected implements (step 606).

At a step 608, the orientation of the teeth 34, lip shrouds 64 and other implements are verified with the profile data associated with the model of the bucket 30. For example, if the machine learning algorithms identify only two teeth 34, but the bucket profile indicates this particular model of bucket 30 should have four teeth, then a discrepancy is noted. More specifically, at step 610, to record any discrepancies, a non-detection counter is incremented and stored on the remote entity 52. Once the non-detection counter exceeds a pre-determined threshold, an alert is generated and displayed to the operator of the work machine 10 indicating that the respective non-detected teeth 34, lip shrouds 64 and/or other implement are missing.

At a step 612, the vision processing controller 202 may superimpose each 3D point cloud generated for detected teeth 34, lip shrouds 64 and other implements over the previously generated disparity map. Then, with respect to each tooth 34 and lip shroud 64 specifically, the length L of each detected tooth and the length of each detected lip shroud is calculated from the 3D point clouds as measured inside the boundary outlined by the machine learning algorithms (step 613). The measured length L of each tooth 34 is transmitted from the vision processing controller 202 to the grade controller 308, which updates the current value of length L of each tooth 34 in the bucket 30 profile within the grade control system 300 (step 613).

Finally, the grade control system 300 utilizes the updated length L value of each tooth 34 in its configuration and positioning of the bucket 30 within the worksite. More specifically, the grade control system 300 utilizes the 3D site map and the bucket 30 profile data to accurately position the work implement 22. With inaccurate tooth measurements, the grade control system 300 may believe a grade is deeper or shallower than its actual depth. This is important, for example, when water or gas pipes are present in the ground. As such, at step 614, the grade control system 300 utilizes the updated current value of the length L of each tooth 34 to accurately position the work implement 22 within the terrain of the worksite, and according to defined boundaries of the 3D site plan.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A work machine, comprising:
   a frame;
   a linkage assembly;
   a work implement connected to the linkage assembly; and
   a grade control calibration system including:
      a vision processing system including a sensor fixed to the linkage assembly and a first controller, the vision processing system configured to measure a length of a cutting portion of the work implement and to transmit the length of the cutting portion of the work implement, and
      a grade control system in communication with the vision processing system and the linkage assembly, the grade control system including a second controller configured to receive the length of the cutting portion of the work implement from the first controller and to calibrate a position of the work implement based on the received length of the cutting portion of the work implement.

2. The work machine of claim 1, wherein the linkage assembly includes a boom pivotally connected to the frame and a stick pivotally connected to the boom and the work implement.

3. The work machine of claim 1, wherein the work implement is a bucket including a plurality of teeth.

4. The work machine of claim 3, wherein the cutting portion of the work implement corresponds to the plurality of teeth and the sensor is configured to measure the length of each of the plurality of teeth.

5. The work machine of claim 3, wherein the work implement is a bucket including a smooth cutting edge, the smooth cutting edge extending a width of the bucket.

6. The work machine of claim 5, wherein the cutting portion of the work implement corresponds to the smooth cutting edge and the sensor is configured to measure the length of the smooth cutting edge along the width of the bucket.

7. The work machine of claim 1, wherein the sensor is a stereo camera that generates a three-dimensional point cloud of the cutting portion of the work implement.

8. The work machine of claim 7, wherein the stereo camera includes a monochrome lens and a color lens.

9. A grade control calibration system for a work machine including a frame, a linkage assembly and a work implement, the grade control calibration system, including:
   a vision processing system, including:
      an imaging device fixed to the linkage assembly and configured to generate a three-dimensional point cloud of a cutting portion of the work implement, and
      a vision controller in electronic communication with the imaging device and configured to calculate a current length of the cutting portion of the work implement based on the three-dimensional point cloud generated by the imaging device, the vision controller further configured to transmit the current length of the cutting portion of the work implement; and a grade control system in communication with the vision processing system and the linkage assembly, the grade control system including:

a grading controller configured to receive the current length of the cutting portion of the work implement from the vision controller and to calibrate a position of the work implement relative to a terrain based on the received current length of the cutting portion of the work implement.

10. The grade control calibration system of claim 9, wherein the linkage assembly includes a boom, a stick and a plurality of electrohydraulic position sensors configured to transmit kinematics data to the vision controller.

11. The grade control calibration system of claim 10, wherein the vision controller determines whether the work implement is within a field of view of the imaging device using the kinematics data.

12. The grade control calibration system of claim 9, wherein the grade control system includes a memory module for storing a three-dimensional site map and a work tool profile, the work tool profile including an original length of the cutting portion of the work implement and a last measured length of the cutting portion of the work implement.

13. The grade control calibration system of claim 12, wherein the grading controller updates the last measured length of the cutting portion of the work implement to the current length of the cutting portion of the work implement in the memory module.

14. The grade control calibration system of claim 13, wherein the grading controller calibrates the grade control system using the site map and the updated last measured length of the cutting portion of the work implement.

15. A method of grading terrain using a work implement of a work machine, the work machine including a linkage assembly and a sensor coupled to the linkage assembly, the method comprising:

detecting the work implement within a field of view of the sensor;

identifying, by the sensor, a cutting portion of the work implement;

calculating, by a controller electronically coupled to the sensor, a length of the cutting portion of the work implement;

calibrating, by the controller, a grade control system of the work machine based on the calculated length of the cutting portion of the work implement;

maneuvering, by the calibrated grade control system, the cutting portion of the work implement proximate the terrain; and grading the terrain with the cutting portion of the work implement.

16. The method of claim 15, wherein the work implement is a bucket, and the cutting portion of the work implement is a plurality of teeth.

17. The method of claim 16, wherein the calculating further includes calculating, by the controller, the length of each of the plurality of teeth.

18. The method of claim 15, wherein the identifying further includes:

generating, by the sensor, a current three-dimensional point cloud scan of the cutting portion of the work implement.

19. The method of claim 18, wherein the calculating further includes:

retrieving, by the controller, a previous three-dimensional point cloud scan of the cutting portion of the work implement, and generating, by the controller, a disparity map of the cutting portion of the work implement based on the previous three-dimensional point cloud scan and the current three-dimensional point cloud scan.

20. The method of claim 19, wherein the calculating the length of the cutting portion of the work implement is based on the generated disparity map.

* * * * *